(12) United States Patent
Shi et al.

(10) Patent No.: US 12,394,830 B1
(45) Date of Patent: Aug. 19, 2025

(54) RECHARGEABLE LITHIUM BATTERY AND MANUFACTURING METHOD THEREOF

(71) Applicant: Hamedata Technology Co., Limited, Guangdong (CN)

(72) Inventors: Yihan Shi, Guangdong (CN); Changjun Yang, Guangdong (CN); Pengfei Xiao, Guangdong (CN); Zhaofu Zhou, Guangdong (CN)

(73) Assignee: Hamedata Technology Co., Limited, Guangdong (CN)

( * ) Notice: Subject to any disclaimer, the term of this patent is extended or adjusted under 35 U.S.C. 154(b) by 0 days.

(21) Appl. No.: 19/073,190

(22) Filed: Mar. 7, 2025

Related U.S. Application Data

(63) Continuation of application No. PCT/CN2025/070743, filed on Jan. 6, 2025.

(30) Foreign Application Priority Data

Nov. 25, 2024 (CN) .......................... 202411686604.6

(51) Int. Cl.
*H01M 10/42* (2006.01)
*H01M 10/04* (2006.01)
(Continued)

(52) U.S. Cl.
CPC ....... *H01M 10/425* (2013.01); *H01M 10/049* (2013.01); *H01M 10/052* (2013.01); *H01M 10/0587* (2013.01); *H01M 50/107* (2021.01); *H01M 50/119* (2021.01); *H01M 50/202* (2021.01); *H01M 50/224* (2021.01);
(Continued)

(58) Field of Classification Search
CPC ...... H01M 50/202; H01M 10/425–2010/4278; H01M 50/284–287
See application file for complete search history.

(56) References Cited

U.S. PATENT DOCUMENTS

| 12,125,992 | B1 * | 10/2024 | Yang | .................... H01M 50/119 |
| 2022/0069392 | A1 * | 3/2022 | Okimoto | ............. H01M 50/152 |

FOREIGN PATENT DOCUMENTS

| CN | 110556487 A | * | 12/2019 | ............. B07C 5/344 |
| CN | 214226999 U | | 9/2021 | |
| CN | 118315645 A | | 7/2024 | |

OTHER PUBLICATIONS

Machine translation of CN 214226999 U (Year: 2021).*
Office Action received in corresponding Chinese Patent Application No. 202411686604.6, dated Jan. 7, 2025, 10 pages.

* cited by examiner

*Primary Examiner* — Robert S Carrico
(74) *Attorney, Agent, or Firm* — Cooper Legal Group, LLC

(57) ABSTRACT

The present application relates to a rechargeable lithium battery and a manufacturing method thereof, the lithium battery includes a voltage regulation circuit assembly, a plastic frame, a first metal housing, a lithium cell and an insulation sheath, wherein the lithium cell includes a winding cell assembly, a high-voltage positive electrode cap assembly and a second metal housing, an annular rolling groove is formed on an upper portion of the second metal housing, the second metal housing is divided by the annular rolling groove into a lower body portion and an upper contraction portion, the contraction portion of the second metal housing is embedded in the first metal housing, an outer surface of the first metal housing is aligned with an outer surface of the second metal housing.

9 Claims, 19 Drawing Sheets

(51) Int. Cl.
*H01M 10/052* (2010.01)
*H01M 10/0587* (2010.01)
*H01M 50/107* (2021.01)
*H01M 50/119* (2021.01)
*H01M 50/202* (2021.01)
*H01M 50/224* (2021.01)
*H01M 50/233* (2021.01)
*H01M 50/287* (2021.01)
*H01M 50/293* (2021.01)

(52) U.S. Cl.
CPC ....... *H01M 50/233* (2021.01); *H01M 50/287* (2021.01); *H01M 50/293* (2021.01)

RECHARGEABLE LITHIUM BATTERY AND MANUFACTURING METHOD THEREOF

CROSS-REFERENCE TO RELATED APPLICATIONS

The present application is a continuation of PCT application serial no. PCT/CN2025/070743, filed on Jan. 6, 2025, which claims the priority benefits of China patent application No. 202411686604.6, filed on Nov. 25, 2024. The entireties of PCT application serial no. PCT/CN2025/070743, and China patent application No. 202411686604.6 are hereby incorporated by reference herein and made a part of this specification.

TECHNICAL FIELD

The present application relates to a technical field of lithium batteries, in particular to a rechargeable lithium battery and a manufacturing method thereof.

BACKGROUND ART

A low-voltage lithium battery converts a high voltage of the lithium battery into a low voltage of 1.5V through a voltage drop circuit board, and the low-voltage lithium battery is manufactured according to sizes of batteries such as an AA battery and an AAA battery, and can replace a common alkaline battery and a nickel-metal hydride battery.

The Chinese patent application with the publication number of CN118315645A discloses a step-down lithium battery. Due to the process of firstly packaging and then forming, there will inevitably be defective products that do not satisfy capacity requirements in a subsequent capacity sorting process. The packaged lithium battery cannot be disassembled without damage, and an internal voltage regulation circuit assembly with high value is difficult to reuse, which needs to be improved.

SUMMARY

The present application provides a rechargeable lithium battery and a manufacturing method thereof in order to solve a technical problem that an existing low-voltage lithium battery adopts a process of firstly packaging and then forming, and defective products may appear in a subsequent capacity sorting process.

In a first aspect, a technical solution provided by the present application is as follows.

A rechargeable lithium battery, including a voltage regulation circuit assembly, a plastic frame, a first metal housing, a lithium cell and an insulation sheath, wherein the voltage regulation circuit assembly and the plastic frame are disposed in the first metal housing, and the plastic frame is configured for fixing the voltage regulation circuit assembly; the lithium cell includes a winding cell assembly, a high-voltage positive electrode cap assembly and a second metal housing, an annular rolling groove is formed on an upper portion of the second metal housing, the winding cell assembly is disposed in the second metal housing and is positioned by the annular rolling groove, the second metal housing is divided by the annular rolling groove into a lower body portion and an upper contraction portion, an outer diameter of the first metal housing is the same as an outer diameter of the body portion of the second metal housing, an inner diameter of the first metal housing is the same as an outer diameter of the contraction portion of the second metal housing, the contraction portion of the second metal housing is embedded in the first metal housing, an outer surface of the first metal housing is aligned with an outer surface of the second metal housing, and the insulation sheath is coated on the first metal housing and the second metal housing.

According to the above technical solution, the voltage regulation circuit assembly of the rechargeable lithium battery of the present application is provided with necessary circuits such as a step-down circuit, a voltage regulator circuit, a charging circuit, and an over-discharge protection circuit electrically connected to the lithium cell, wherein the low-voltage positive electrode cap is configured as a positive electrode of the battery, and the second metal housing is configured as a negative electrode of the battery, so as to stably output a low voltage.

According to the present application, complete and independent lithium cells are manufactured firstly, and then the formation and capacity sorting are performed. A qualified lithium cell is selected and placed into the first metal housing, so that the technical problem that the capacity of the lithium battery does not satisfy the requirements in the prior art can be solved, and the failure rate of the product is greatly reduced. The contraction portion of the second metal housing is embedded into the first metal housing, the outer wall of the contraction portion of the second metal housing is tightly matched with the inner wall of the first metal housing under the condition that the size is proper, a large static friction is generated, and thus the first metal housing and the second metal housing can be better prevented from being separated. The insulation sheath is coated on the first metal housing and the second metal housing, which further ensures that the first metal housing and the second metal housing cannot be separated, and thus ensuring the integrity of the lithium battery. If a failure is found in a detection process, the first metal housing and the second metal housing can be pulled out and separated after the insulation sheath is removed, and the disassembly is very convenient. If there is an issue with the lithium cell, the lithium cell is replaced; and if there is an issue with the voltage regulation circuit assembly, the voltage regulation circuit assembly is replaced. A failure voltage regulation circuit assembly can be reused after being repaired. Of course, the electrical performance qualification detection may also be performed before the insulation sheath is coated. The insulation sheath is coated only on a qualified lithium battery, so that redundant consumption of the insulation sheath can be avoided.

Optionally, the first metal housing and the second metal housing are fixedly connected by spot welding, or a lower edge of the first metal housing contracts inward to form a constriction to limit the contraction portion of the second metal housing.

Optionally, the voltage regulation circuit assembly includes a low-voltage positive electrode cap, a PCB, a charging interface, a high-voltage positive electrode elastic sheet, a negative electrode elastic sheet and an elastic ejector pin; the charging interface, the high-voltage positive electrode elastic sheet, the negative electrode elastic sheet and the elastic ejector pin are all disposed on the PCB, the plastic frame and the low-voltage positive electrode cap are limited by a top wall of the first metal housing, a positive and negative electrodes isolation sheet is further disposed between the low-voltage positive electrode cap and the top wall of the first metal housing, a through hole is formed on a top of the first metal housing, a first charging avoidance hole is formed on a side surface of the first metal housing, the low-voltage positive electrode cap extends out of the through hole, the charging avoidance hole is configured to expose the charging interface of the voltage regulation circuit assembly, the elastic ejector pin abuts against an inner wall of the low-voltage positive electrode cap, the negative electrode elastic sheet abuts against an inner wall of the first metal housing, the high-voltage positive electrode elastic sheet abuts against the high-voltage positive electrode cap assembly, the first metal housing and the second metal housing are in contact and conductive, and a second charging avoidance hole is formed at a corresponding position on a side surface of the insulation sheath.

Optionally, the plastic frame includes an upper frame and a lower frame fixed through snap-fit, and the PCB is fixed between the upper frame and the lower frame.

Optionally, the plastic frame is adhered to an inner wall of the first metal housing through glue.

Optionally, the plastic frame is disposed in the first metal housing in an up-and-down floating manner, and the high-voltage positive electrode elastic sheet is further configured for abutting the plastic frame against the top wall of the first metal housing.

Optionally, the low-voltage positive electrode cap is adhered to the plastic frame through glue, and the positive and negative electrodes isolation sheet is adhered to the plastic frame and the low-voltage positive electrode cap through glue.

Optionally, an outer peripheral surface of the plastic frame is provided with protruding vertical guide strips for reducing friction between the plastic frame and the inner wall of the first metal housing.

Optionally, the negative electrode elastic sheet is provided with a convex hull protruding outward thereon, and the convex hull is in contact with the inner wall of the first metal housing for reducing friction between the negative electrode elastic sheet and the inner wall of the first metal housing.

In a second aspect, the present application further provides another technical solution: a method for manufacturing the rechargeable lithium battery described above, including the following steps:
S1, placing the winding cell assembly into the second metal housing, manufacturing the annular rolling groove on the upper portion of the second metal housing, welding a negative electrode tab of the winding cell assembly to a bottom wall of the second metal housing, welding a positive electrode tab of the winding cell assembly to the high-voltage positive electrode cap assembly, injecting electrolyte, placing the high-voltage positive electrode cap assembly into the second metal housing, manufacturing the contraction portion on the upper portion of the second metal housing, manufacturing a spinning edge on an upper edge of the second metal housing, fixing the high-voltage positive electrode cap assembly inside the contraction portion to form the lithium cell, and performing formation and capacity sorting on the lithium cell;
S2, fixing the voltage regulation circuit assembly on the plastic frame, and then installing the voltage regulation circuit assembly and the plastic frame together into the first metal housing;
S3, embedding an upper end of the lithium cell into the first metal housing;
S4, coating the insulation sheath, performing heating and shrinking, so that the insulation sheath is coated on the first metal housing and the lithium cell.

In summary, the present application includes at least one of the following beneficial technical effects.

1. The rechargeable lithium battery of the present application is provided with the voltage regulation circuit assembly, so that a low voltage can be output stably.

2. According to the present application, the complete and independent lithium cells are manufactured firstly, and then the formation and capacity sorting are performed. The qualified lithium cell is selected and placed into the first metal housing, so that the technical problem that the capacity of the lithium battery does not satisfy the requirements in the prior art can be solved, and the failure rate of the product is greatly reduced.

3. The outer wall of the contraction portion of the second metal housing is tightly matched with the inner wall of the first metal housing, a large static friction is generated, and thus the first metal housing and the second metal housing can be better prevented from being separated. The insulation sheath further ensures that the first metal housing and the second metal housing cannot be separated, and thus ensuring the integrity of the lithium battery. The disassembly of the first metal housing and the second metal housing is very convenient.

DETAILED DESCRIPTION

Figure 1:
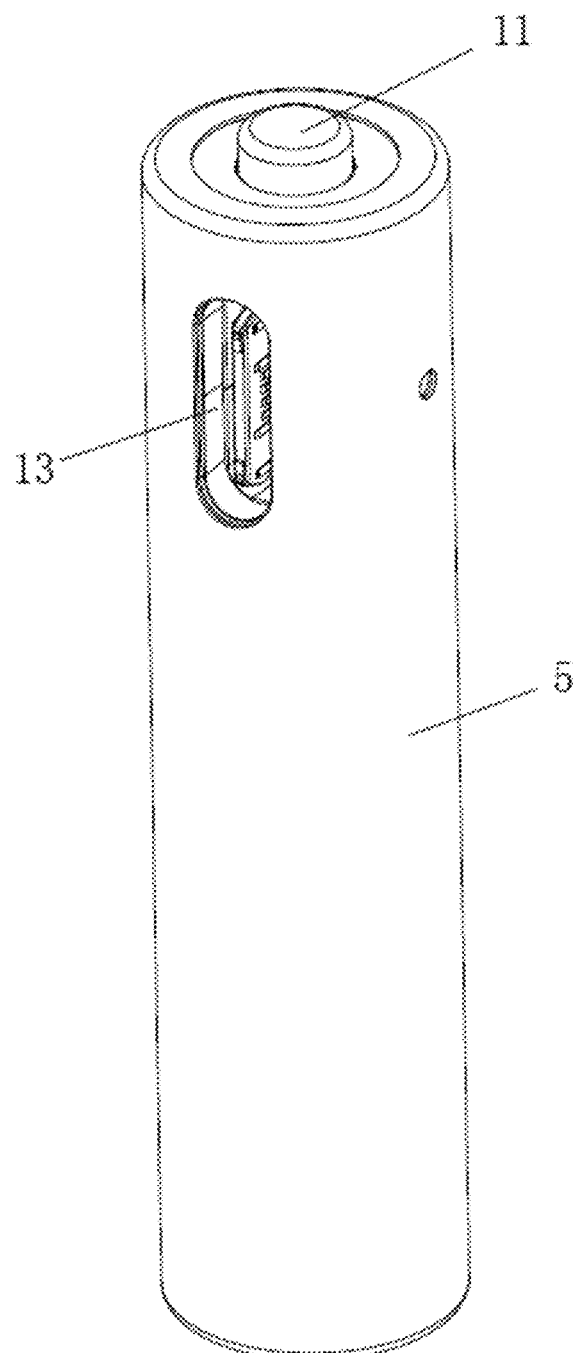
FIG. 1 is a perspective view of a lithium battery according to Embodiment 1 of the present application.
Figure 2:
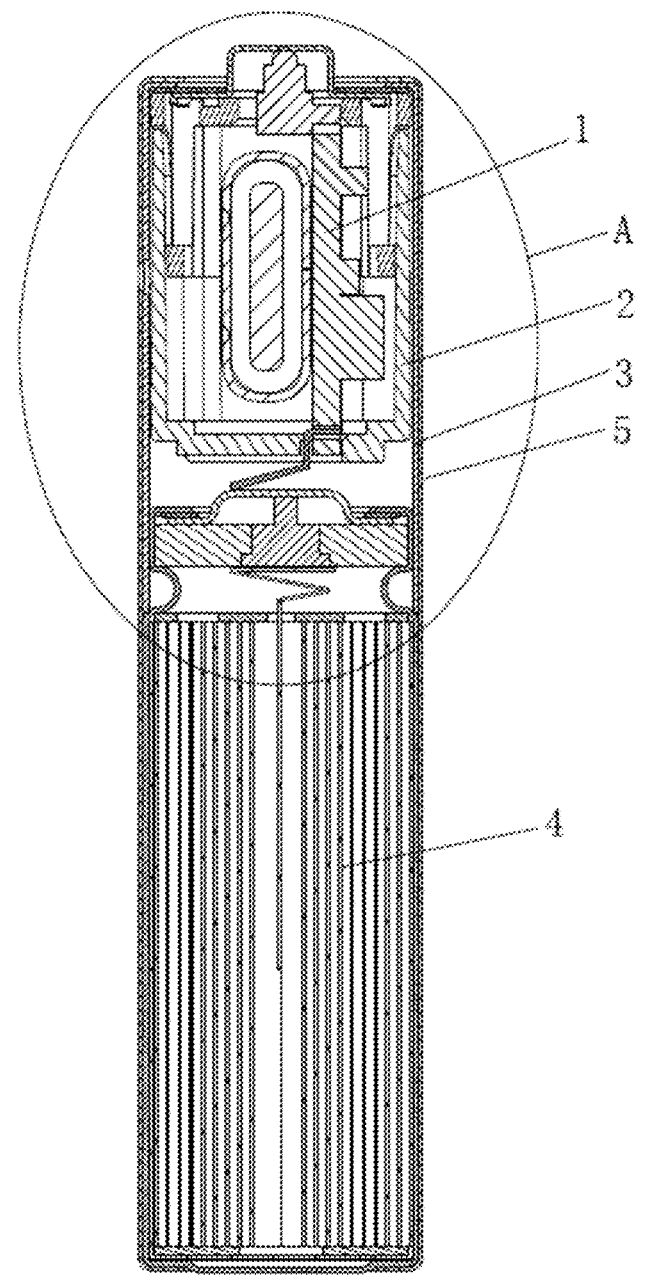
FIG. 2 is a schematic diagram of a half-sectional structure of the lithium battery according to Embodiment 1 of the present application.

The present application will be further described in detail with reference to FIG. 1 to FIG. 20 as follows.

Embodiment 1

Referring to FIG. 1 to FIG. 5, this embodiment discloses a rechargeable lithium battery, including a voltage regulation circuit assembly 1, a plastic frame 2, a first metal housing 3, a lithium cell 4, and an insulation sheath 5. Specifically, the rechargeable lithium battery may be an AAA battery, but the present application is not limited thereto.

Figure 4:
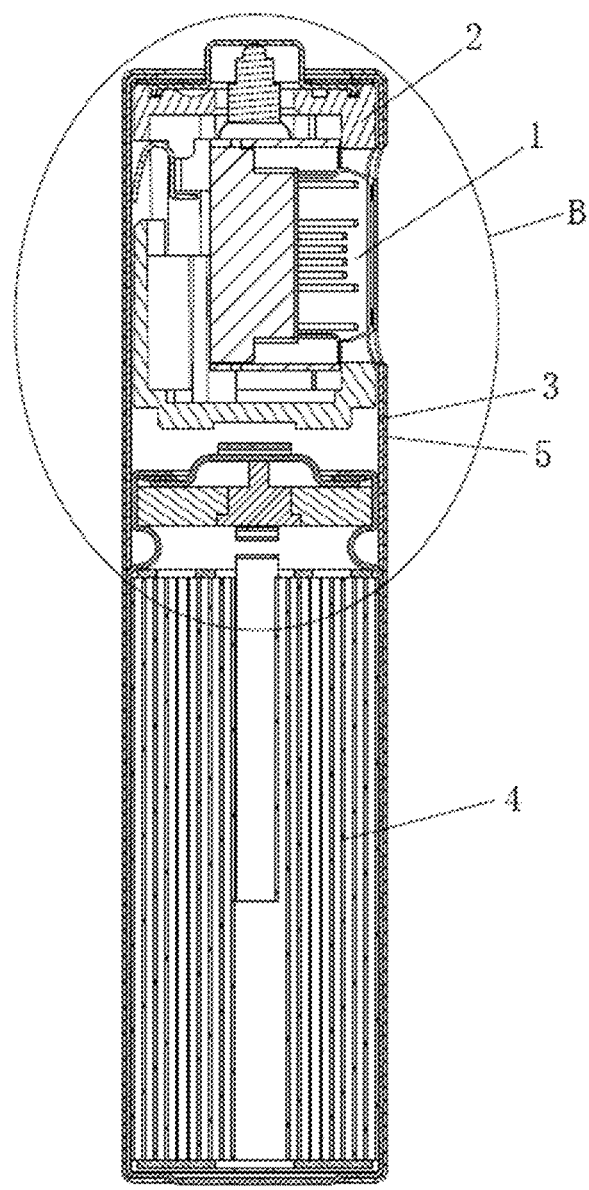
FIG. 4 is a schematic diagram of a half-sectional structure of the lithium battery from another angle according to Embodiment 1 of the present application.
Figure 6:
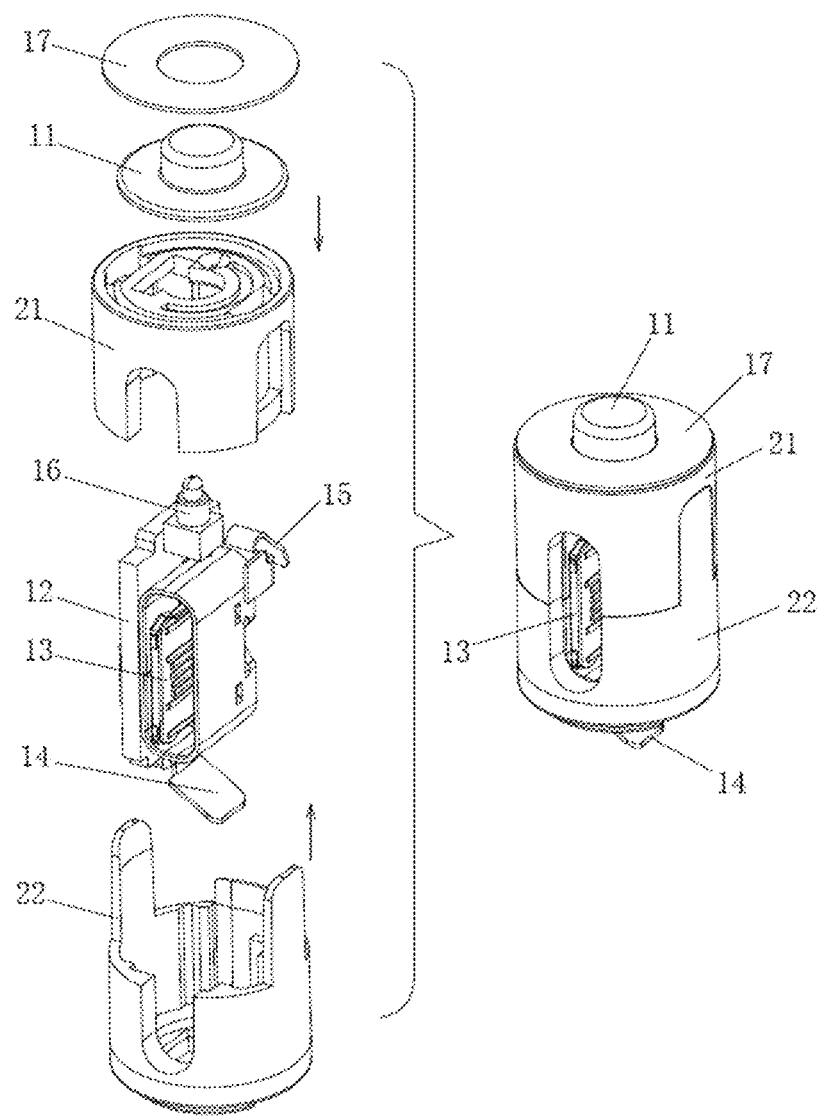
FIG. 6 is a schematic diagram of an assembly operation of a voltage regulation circuit assembly and a plastic frame according to Embodiment 1 of the present application.
Figure 7:
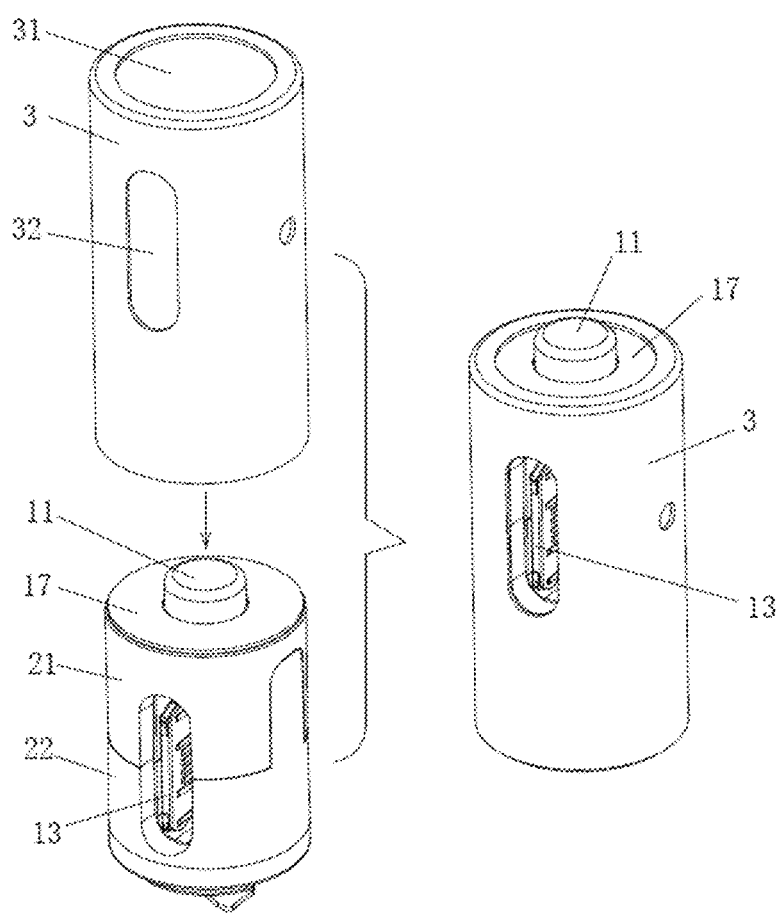
FIG. 7 is a schematic diagram of an assembly operation of installing the voltage regulation circuit assembly and the plastic frame into a first metal housing according to Embodiment 1 of the present application.
Figure 8:
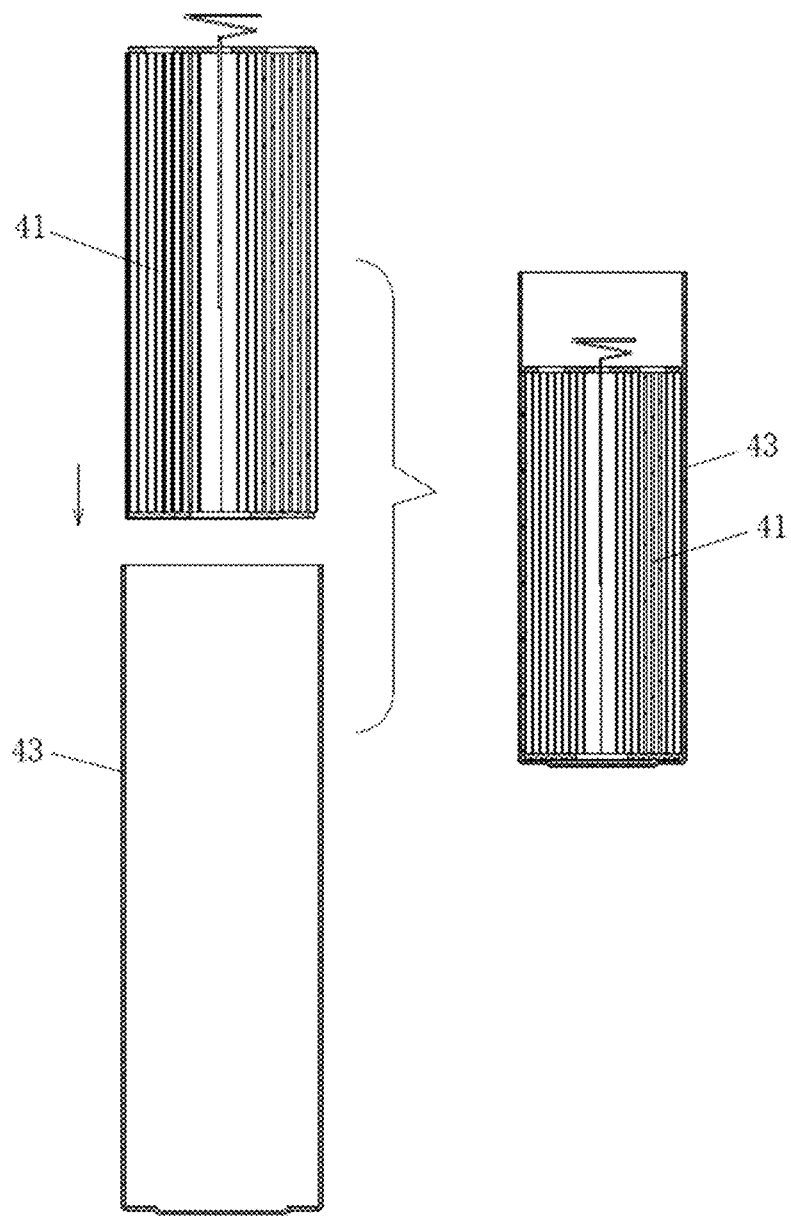
FIG. 8 is a schematic diagram of an assembly operation of installing a winding cell assembly into a second metal housing according to Embodiment 1 of the present application.
Figure 9:
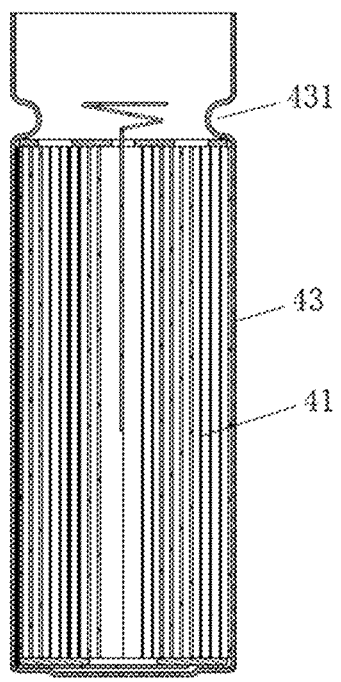
FIG. 9 is a schematic diagram of manufacturing an annular rolling groove on an upper portion of the second metal housing according to Embodiment 1 of the present application.
Figure 10:
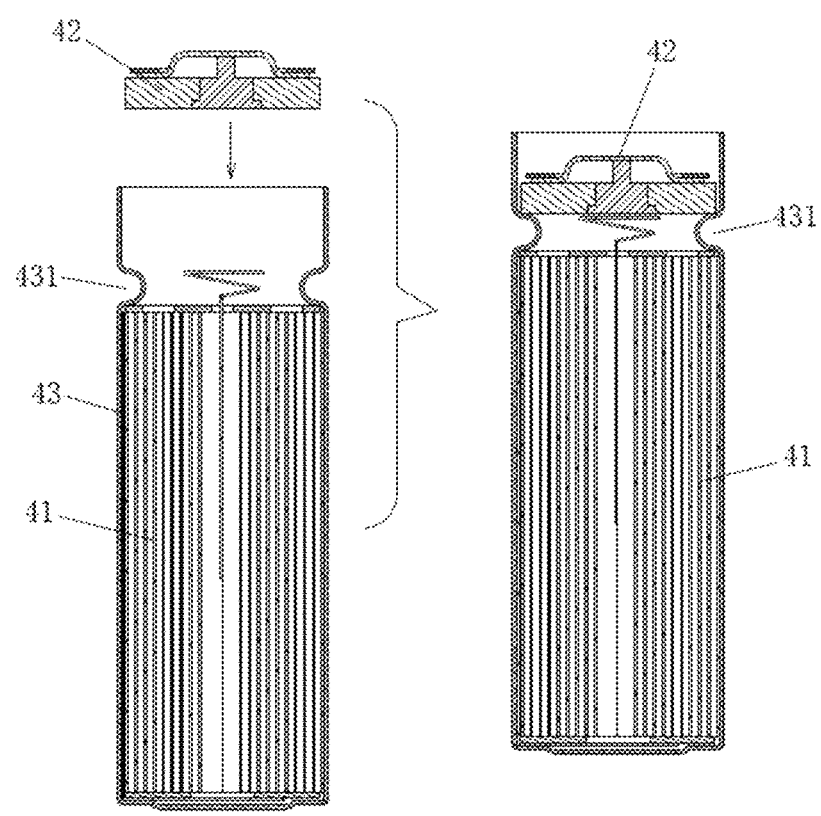
FIG. 10 is a schematic diagram of an assembly operation of installing a high-voltage positive electrode cap assembly into the second metal housing according to Embodiment 1 of the present application.
Figure 11:
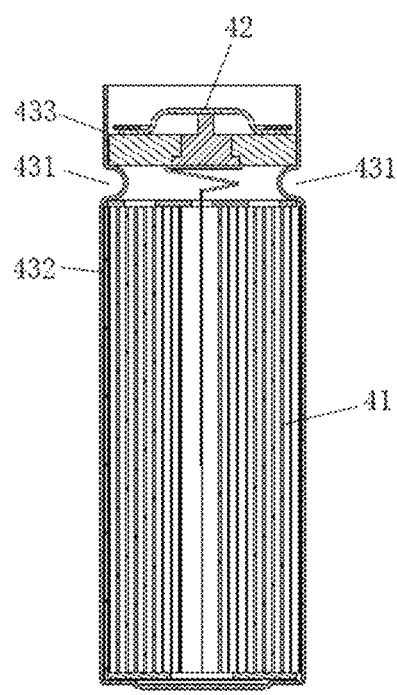
FIG. 11 is a schematic diagram of manufacturing a contraction portion on an upper portion of the second metal housing according to Embodiment 1 of the present application.

Referring to FIG. 4, FIG. 6 and FIG. 7, the voltage regulation circuit assembly 1 and the plastic frame 2 are disposed in the first metal housing 3, and the plastic frame 2 is configured for fixing the voltage regulation circuit assembly 1. The plastic frame 2 includes an upper frame 21 and a lower frame 22 fixed through snap-fit. A PCB 12 is fixed between the upper frame 21 and the lower frame 22. The plastic frame 2 can effectively prevent the PCB 12 from being short-circuited due to contact with the first metal housing 3, while also better fixing the PCB 12 to prevent the position of the PCB 12 from changing.

Figure 12:
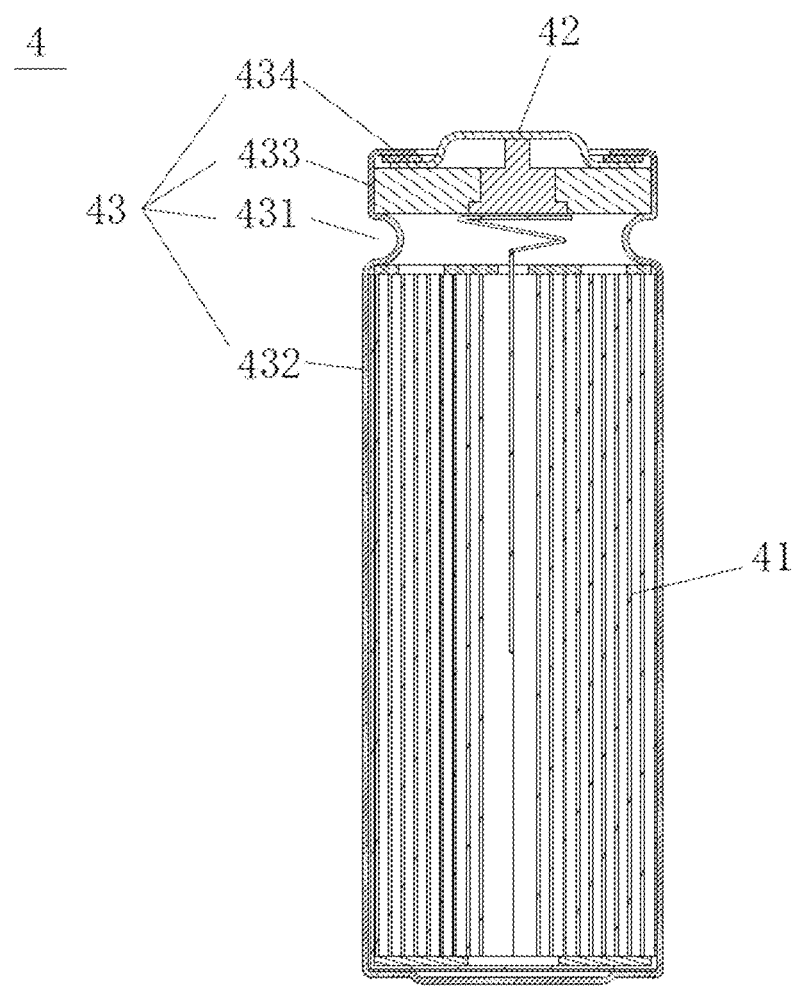
FIG. 12 is a schematic diagram of manufacturing a spinning edge on an upper portion of the second metal housing according to Embodiment 1 of the present application.

Referring to FIG. 12, the lithium cell 4 includes a winding cell assembly 41, a high-voltage positive electrode cap assembly 42 and a second metal housing 43. An annular rolling groove 431 is formed on an upper portion of the second metal housing 43, the winding cell assembly 41 is disposed in the second metal housing 43 and is positioned by the annular rolling groove 431. The second metal housing 43 is divided into a lower body portion 432 and an upper contraction portion 433 by the annular rolling groove 431.

Figure 3:
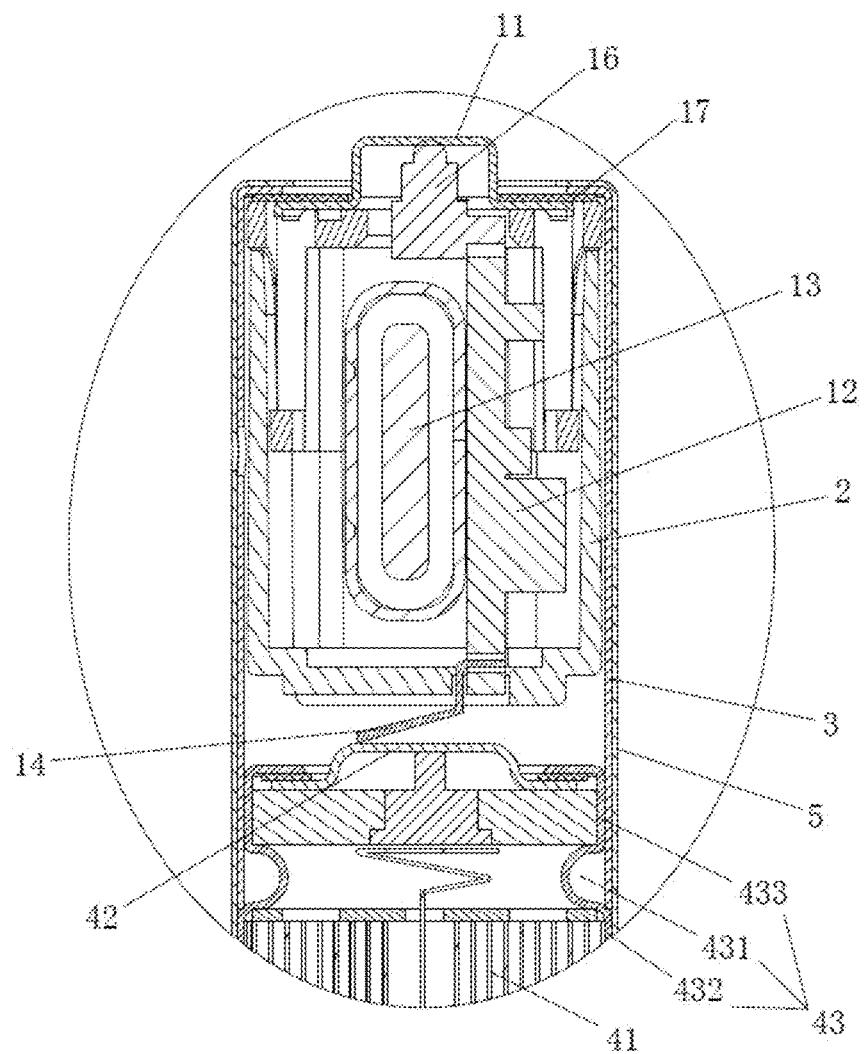
FIG. 3 is an enlarged view of part A in FIG. 2.
Figure 5:
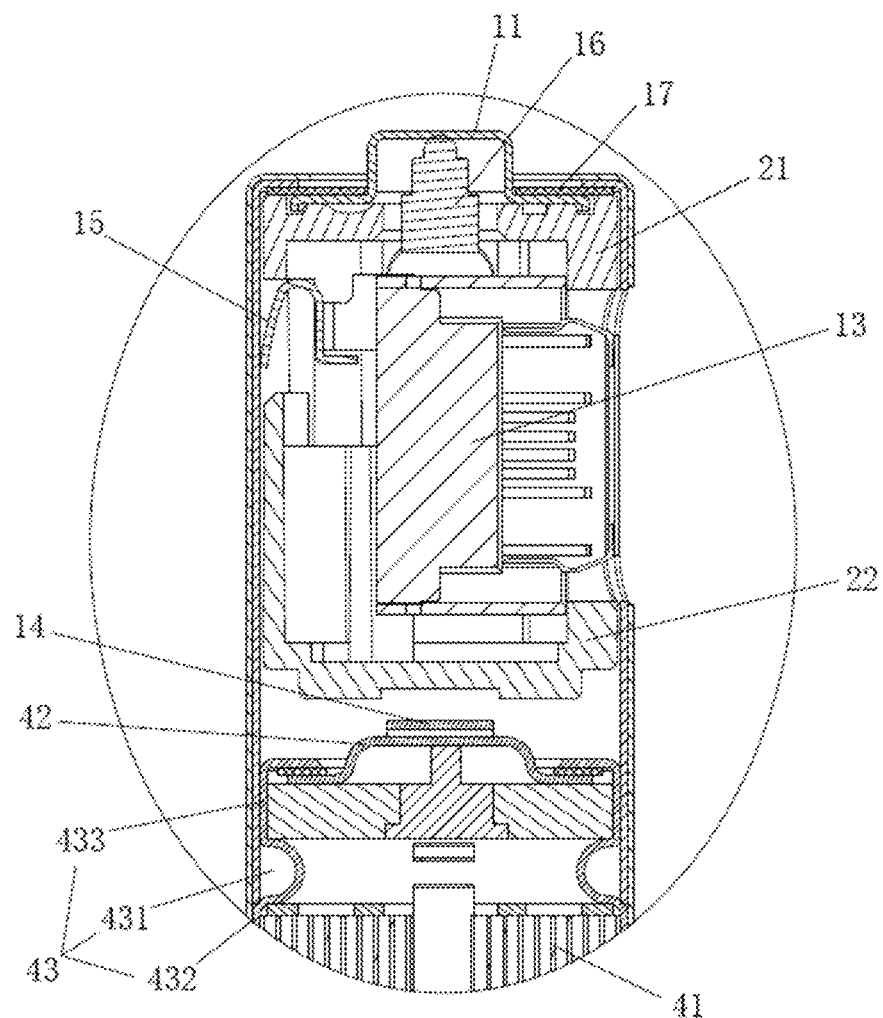
FIG. 5 is an enlarged view of part B in FIG. 4.
Figure 13:
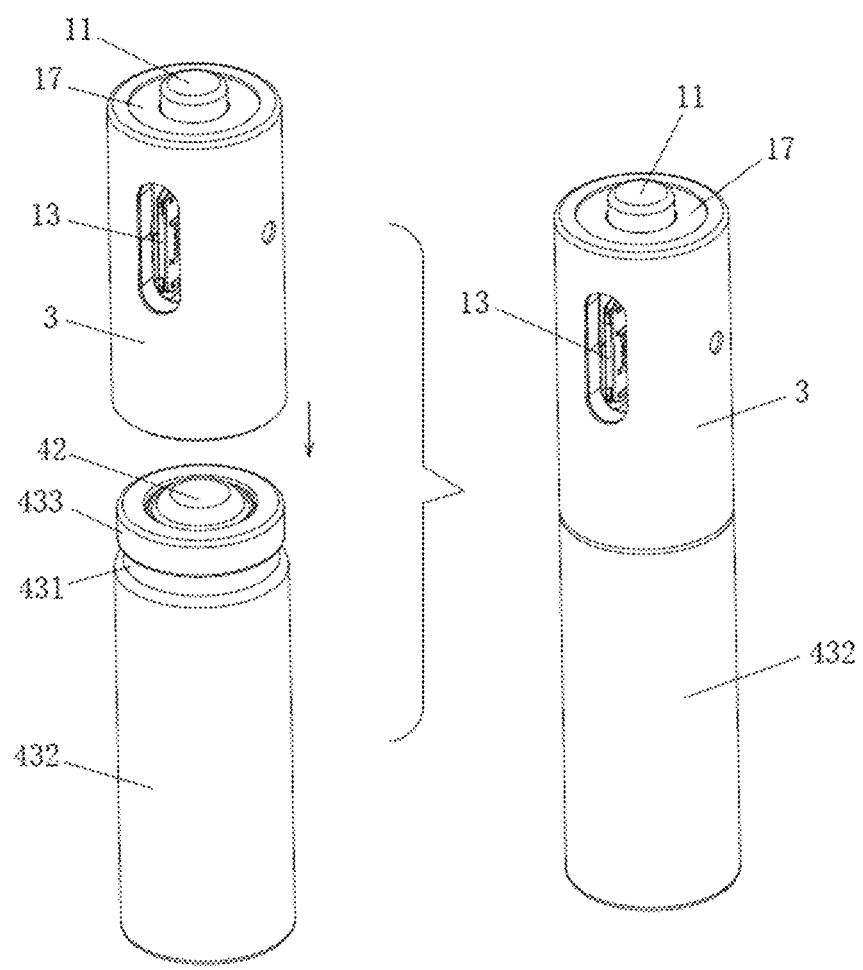
FIG. 13 is a schematic diagram of an assembly operation of installing a lithium cell into the first metal housing according to Embodiment 1 of the present application.
Figure 14:
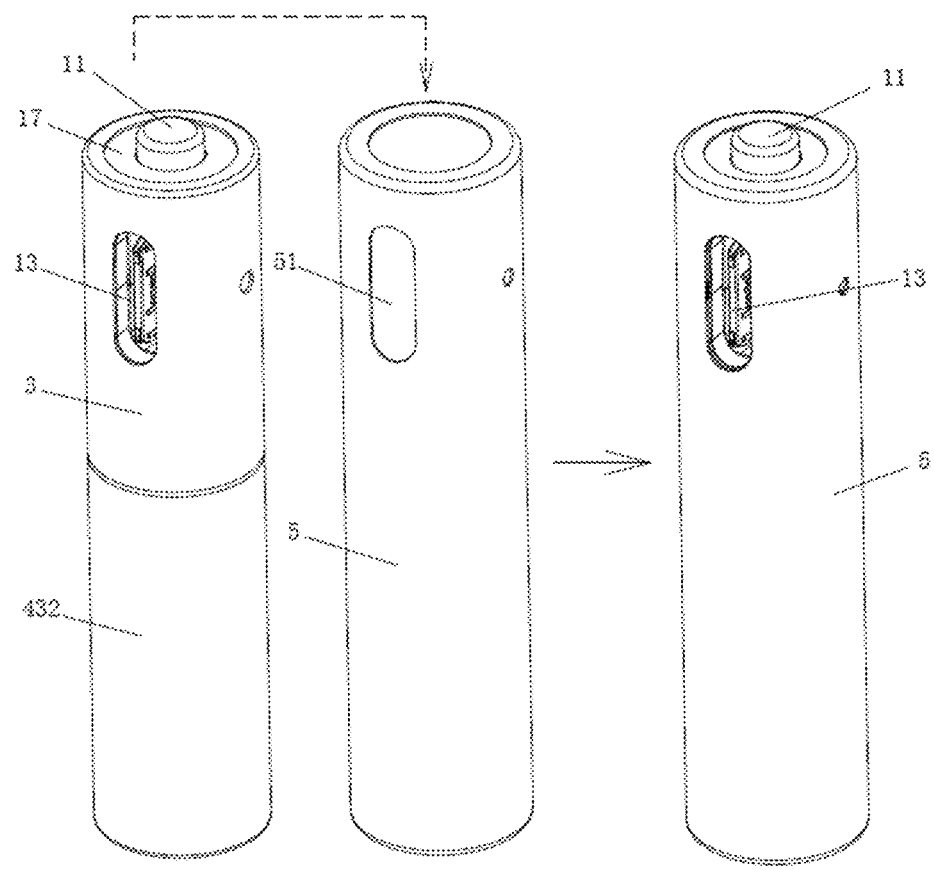
FIG. 14 is a schematic diagram of an assembly operation of coating an insulation sheath and performing heating contraction according to Embodiment 1 of the present application.

Referring to FIG. 3, FIG. 5 and FIG. 13, an outer diameter of the first metal housing 3 is the same as that of the body portion 432 of the second metal housing 43, and an inner diameter of the first metal housing 3 is the same as an outer diameter of the contraction portion 433 of the second metal housing 43. The contraction portion 433 of the second metal housing 43 is embedded into the first metal housing 3. An outer surface of the first metal housing 3 is aligned with an outer surface of the second metal housing 43. The insulation sheath 5 is coated on the first metal housing 3 and the second metal housing 43.

Referring to FIG. 3, FIG. 5, and FIG. 6, the voltage regulation circuit assembly 1 includes a low-voltage positive electrode cap 11, a PCB 12, a charging interface 13, a high-voltage positive electrode elastic sheet 14, a negative electrode elastic sheet 15, and an elastic ejector pin 16. The charging interface 13, the high-voltage positive electrode elastic sheet 14, the negative electrode elastic sheet 15, and the elastic ejector pin 16 are all disposed on the PCB 12. The plastic frame 2 and the low-voltage positive electrode cap 11 are limited by a top wall of the first metal housing 3. A positive and negative electrodes isolation sheet 17 is further disposed between the low-voltage positive electrode cap 11 and the top wall of the first metal housing 3. A through hole 31 is formed on a top of the first metal housing 3, and a first charging avoidance hole 32 is formed on a side surface of the first metal housing 3. The low-voltage positive electrode cap 11 extends out of the through hole 31, and the charging avoidance hole is configured to expose the charging interface 13 of the voltage regulation circuit assembly 1. The elastic ejector pin 16 abuts against an inner wall of the low-voltage positive electrode cap 11, the negative electrode elastic sheet 15 abuts against an inner wall of the first metal housing 3, and the high-voltage positive electrode elastic sheet 14 abuts against the high-voltage positive electrode cap assembly 42. The first metal housing 3 and the second metal housing 43 are in contact and conductive, and a second charging avoidance hole 51 is formed at a corresponding position on a side surface of the insulation sheath 5. The positive and negative electrodes isolation sheet 17 is configured for preventing the low-voltage positive electrode cap 11 and the first metal housing 3 from being short-circuited, thereby ensuring electrical safety.

In this embodiment, the plastic frame 2 is adhered to the inner wall of the first metal housing 3 through glue, so that the plastic frame 2 can be prevented from rotating on the first metal housing 3 to avoid dislocation, and the charging interface 13 cannot be completely exposed.

The manufacturing method of the rechargeable lithium battery of this embodiment includes the following steps:

S1, placing the winding cell assembly 41 into the second metal housing 43, manufacturing the annular rolling groove 431 on an upper portion of the second metal housing 43, welding a negative electrode tab of the winding cell assembly 41 to a bottom wall of the second metal housing 43, welding a positive electrode tab of the winding cell assembly 41 to the high-voltage positive electrode cap assembly 42, injecting electrolyte, placing the high-voltage positive electrode cap assembly 42 into the second metal housing 43, manufacturing a contraction portion 433 on the upper portion of the second metal housing 43, manufacturing a spinning edge 434 on an upper edge of the second metal housing 43, fixing the high-voltage positive electrode cap assembly 42 inside the contraction portion 433 to form the lithium cell 4, and performing formation and capacity sorting on the lithium cell 4;

S2, fixing the voltage regulation circuit assembly 1 on the plastic frame 2, and then installing the voltage regulation circuit assembly 1 and the plastic frame 2 together into the first metal housing 3;

S3, embedding an upper end of the lithium cell 4 into the first metal housing 3;

S4, coating the insulation sheath 5, and performing heating and shrinking, so that the insulation sheath 5 is coated on the first metal housing 3 and the lithium cell 4.

The manufacturing method according to the present application is reasonable in process, high in yield, capable of realizing industrialization and particularly suitable for large-scale production.

The specific connection principle of the circuit of the present application is as follows: the positive electrode tab of the winding cell assembly 41 is welded on a lower surface of the high-voltage positive electrode cap assembly 42, and is connected to the PCB 12 through the high-voltage positive electrode elastic sheet 14; the negative electrode tab of the winding cell assembly 41 is welded on the bottom wall of the second metal housing 43, and is connected to the PCB 12 through the second metal housing 43, the first metal housing 3 and the negative electrode elastic sheet 15; after voltage reduction processing by the circuit on the PCB 12, a positive electrode low voltage is output from the low-voltage positive electrode cap 11, and the negative electrode of the lithium battery is output from the second metal housing 43.

The voltage regulation circuit assembly 1 of the rechargeable lithium battery of the present application is provided with necessary circuits such as a step-down circuit, a voltage regulator circuit, a charging circuit, and an over-discharge protection circuit electrically connected to the lithium cell 4, wherein the low-voltage positive electrode cap 11 is configured as a positive electrode of the battery, and the second metal housing 43 is configured as a negative electrode of the battery, so that a low voltage is output stably.

According to the present application, the complete and independent lithium cells 4 are manufactured firstly, and then the formation and capacity sorting are performed. The qualified lithium cell is selected and placed into the first metal housing 3, so that the technical problem that the capacity of the lithium battery does not satisfy the requirements in the prior art can be solved, and the failure rate of the product is greatly reduced. The contraction portion 433 of the second metal housing 43 is embedded into the first metal housing 3, the outer wall of the contraction portion 433 of the second metal housing 43 is tightly matched with the inner wall of the first metal housing 3 under the condition that the size is proper, a large static friction is generated, and thus the first metal housing 3 and the second metal housing 43 can be better prevented from being separated. The insulation sheath 5 is coated on the first metal housing 3 and the second metal housing 43, which further ensures that the first metal housing 3 and the second metal housing 43 cannot be separated, and thus ensuring the integrity of the lithium battery. If a failure is found in the detection process, the first metal housing 3 and the second metal housing 43 can be pulled out and separated after the insulation sheath 5 is removed, and the disassembly is very convenient. If there is an issue with the lithium cell 4, the lithium cell 4 is replaced; and if there is an issue with the voltage regulation circuit assembly 1, the voltage regulation circuit assembly 1 is replaced. The failure voltage regulation circuit assembly 1 can be reused after being repaired. Of course, the electrical performance qualification detection may also be performed before the insulation sheath 5 is coated. The insulation sheath 5 is coated only on a qualified lithium battery, so that redundant consumption of the insulation sheath 5 can be avoided.

In the present embodiment, when there is a further requirement on the structural strength of the housing of the lithium battery, the connection relationship between the first metal housing 3 and the second metal housing 43 may also be strengthened. For example, the first metal housing 3 and the second metal housing 43 may be fixedly connected by spot welding, or a lower edge of the first metal housing 3 contracts inward to form a contraction, so as to limit the contraction portion 433 of the second metal housing 43. However, only convenience of disassembly and assembly may be affected, and the connection method may be reasonably selected as required.

Embodiment 2

Since a tail end of the cylindrical battery needs to be in contact with a negative electrode elastic element of an external battery compartment to realize electrical connection. Sometimes, the negative electrode elastic element may deform, a spring may fall off and the like, which may easily lead to poor electrical contact of the cylindrical battery.

Figure 15:
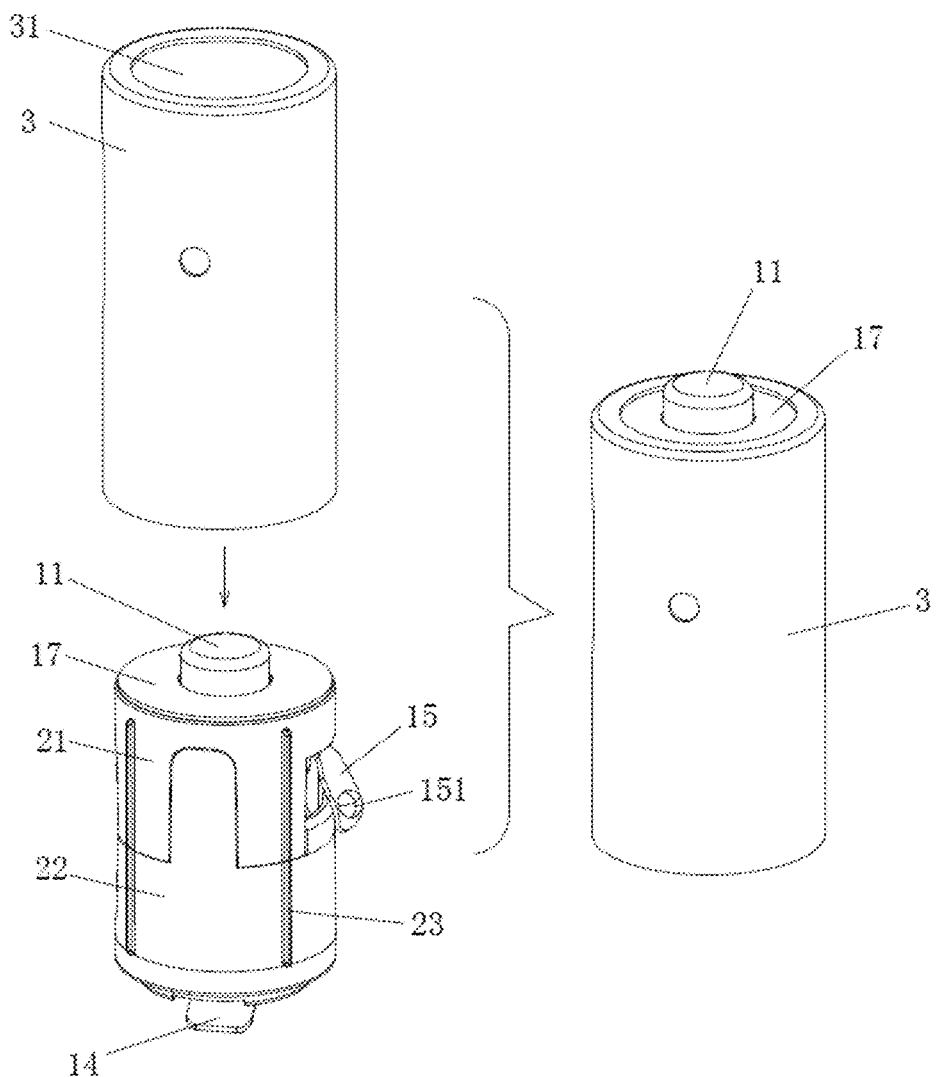
FIG. 15 is a schematic diagram of an assembly operation of installing a voltage regulation circuit assembly and a plastic frame into a first metal housing according to Embodiment 2 of the present application.
Figure 16:
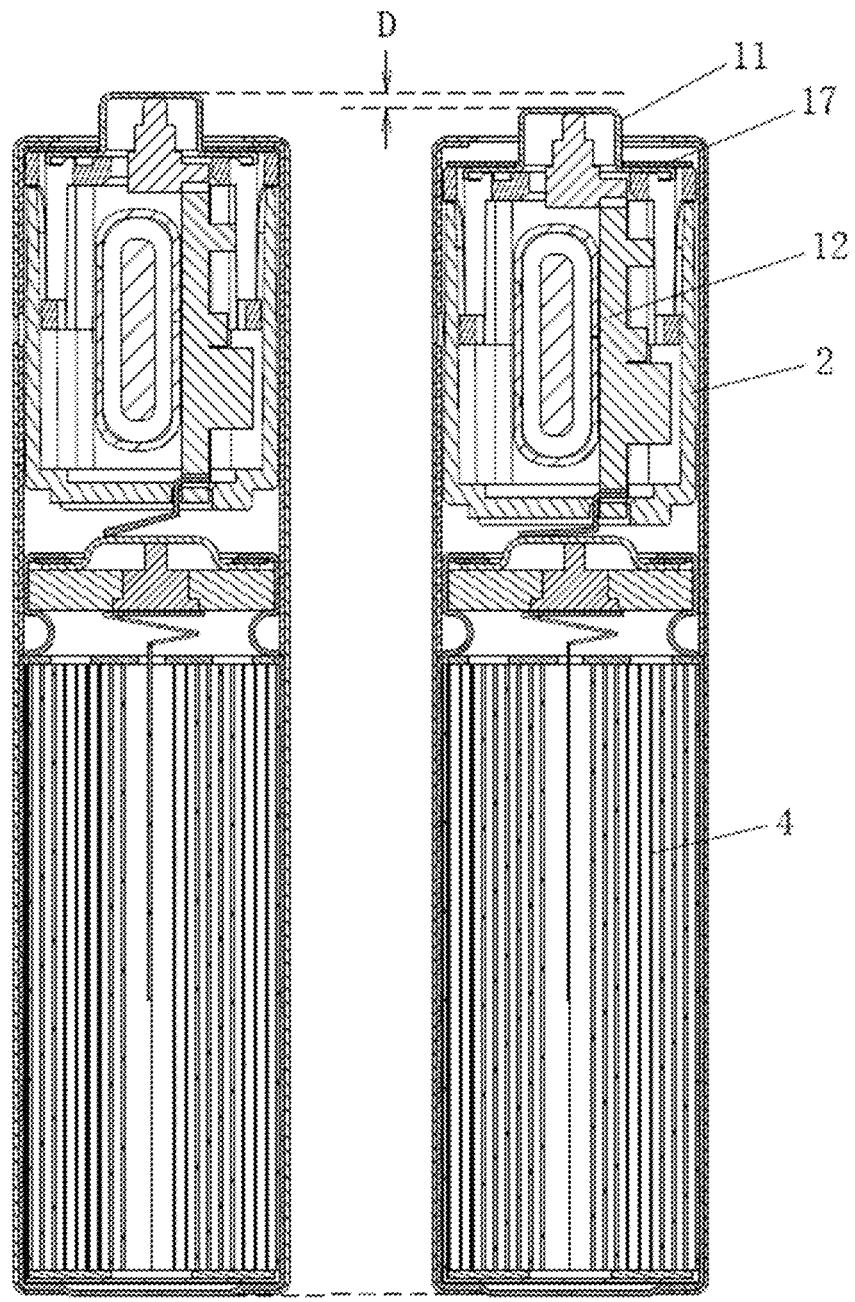
FIG. 16 is a comparison diagram of the voltage regulation circuit assembly and the plastic frame before and after stretching according to Embodiment 2 of the present application.
Figure 17:
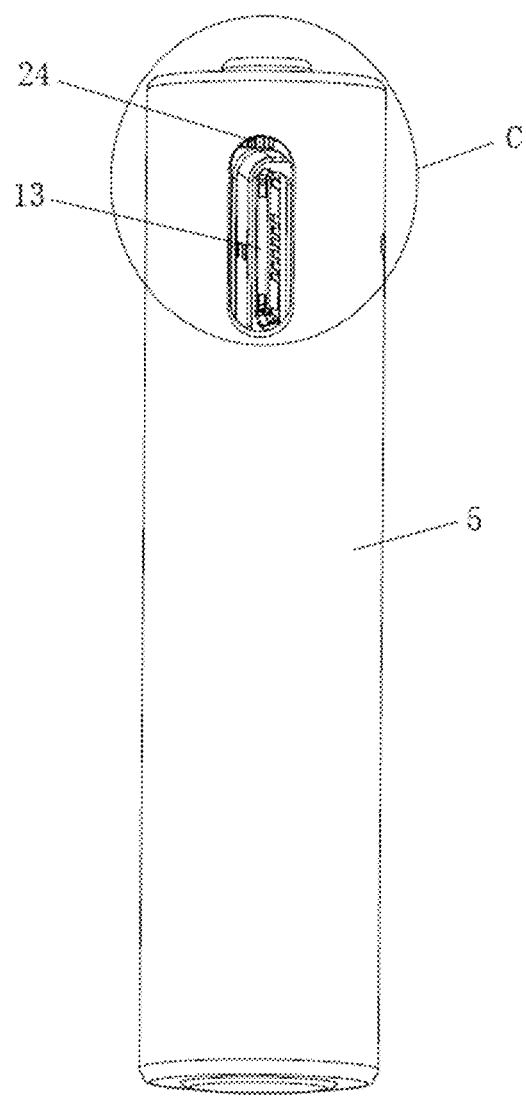
FIG. 17 is a perspective view of a lithium battery according to Embodiment 3 of the present application.
Figure 18:
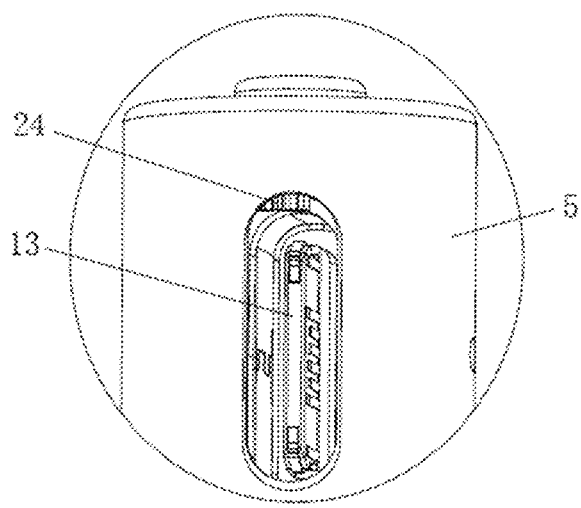
FIG. 18 is an enlarged view of part C in FIG. 17 (the voltage regulation circuit assembly and the plastic frame are in a compressed state)
Figure 19:
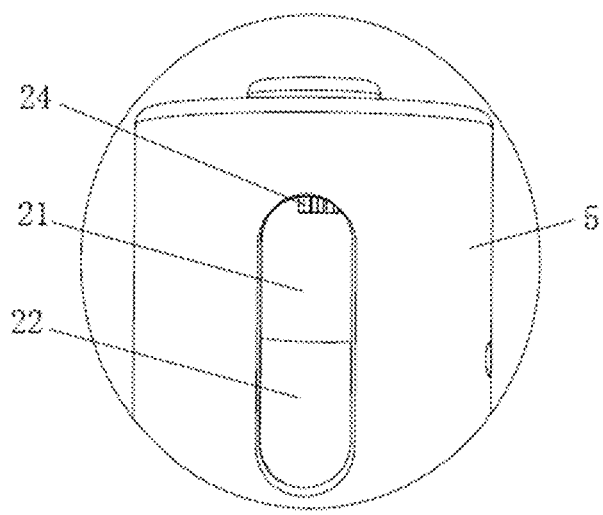
FIG. 19 is a partial schematic diagram of a charging interface rotating to a hidden state.

Referring to FIG. 15 and FIG. 16, Embodiment 2 is different from Embodiment 1 in that: the plastic frame 2 can be disposed in the first metal housing 3 in an up-and-down floating manner with a floating distance D, and the high-voltage positive electrode elastic sheet 14 is further configured for abutting the plastic frame 2 against the top wall of the first metal housing 3. First, a height of the low-voltage positive electrode cap 11 is increased by 1-4 mm, so that the lithium battery of the present application is 1-4 mm longer than the existing lithium battery as a whole. When the lithium battery is installed in the battery compartment, the low-voltage positive electrode cap 11 is retracted under pressure, so that the installation of the lithium battery is not affected, while the installation effect of the lithium battery is tighter. If the negative electrode elastic element of the battery compartment is deformed or has a deteriorated elasticity, the low-voltage positive electrode cap 11 is only partially retracted or not retracted, thereby making up a space caused by the elastic loss of the negative electrode elastic element of the battery compartment, and ensuring excellent electrical contact.

In this embodiment, the low-voltage positive electrode cap 11 is adhered to the plastic frame 2 through glue, and the positive and negative electrodes isolation sheet 17 are adhered to the plastic frame 2 and the low-voltage positive electrode cap 11 through glue. In this way, the low-voltage positive electrode cap 11, the plastic frame 2 and the voltage regulation circuit assembly integrally float up and down without being dispersed.

Referring to FIG. 15, the high-voltage positive electrode elastic sheet 14 needs to be selected to have a proper elasticity. The high-voltage positive electrode elastic sheet 14 should have enough elastic force to push up the low-voltage positive electrode cap 11, the plastic frame 2 and the voltage regulation circuit assembly 1, while the elastic force should not be too strong, otherwise the battery cannot be loaded into the battery compartment. The plastic frame 2 needs to be free to float up and down, and the friction between the plastic frame 2 and the inner wall of the first metal housing 3 needs to be as small as possible. Therefore, the present application makes the following improvements: firstly, an outer peripheral surface of the plastic frame 2 is provided with protruding vertical guide strips 23, and the friction between the plastic frame 2 and the inner wall of the first metal housing 3 can be reduced due to the reduced contact area therebetween; secondly, the negative electrode elastic sheet 15 is provided with a convex hull 151 protruding outward, and the contact area between the negative electrode elastic sheet 15 and the inner wall of the first metal housing 3 can also be reduced due to the contact between the convex hull 151 and the inner wall of the first metal housing 3, thereby reducing the friction between the negative electrode elastic sheet 15 and the inner wall of the first metal housing 3. Other structures and beneficial effects are consistent with Embodiment 1, and details are not described herein again.

Embodiment 3

Referring to FIG. 17 to FIG. 20, Embodiment 3 is different from Embodiment 2 in that the plastic frame 2 not only can float up and down in the first metal housing 3, but also can rotate in the first metal housing 3. In this way, the charging interface 13 will be hidden in the first metal housing 3 after rotating by a certain angle, and thus appearance of the lithium battery is more attractive, the charging interface 13 can be effectively protected, and the safety is improved.

Figure 20:
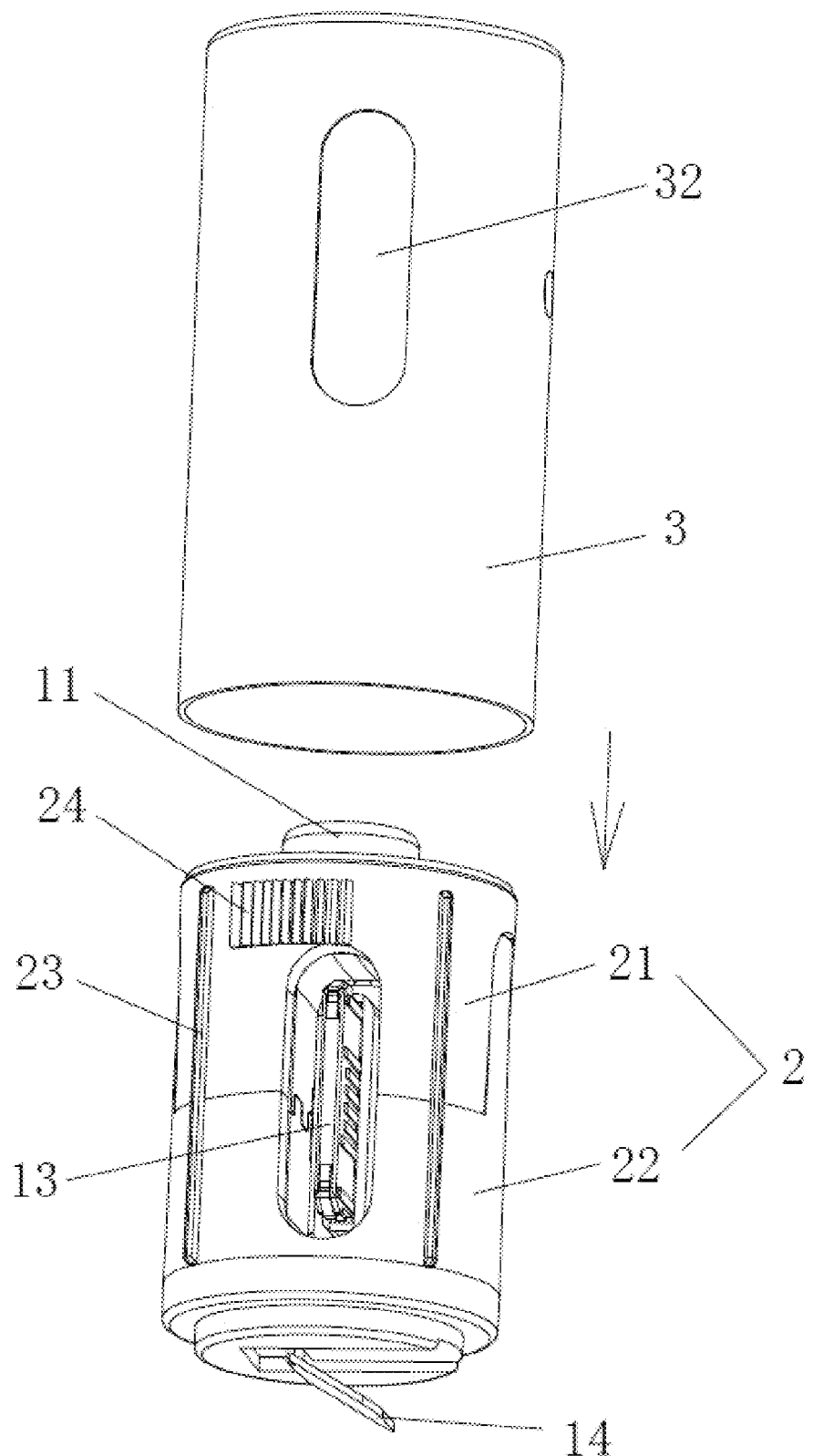
FIG. 20 is a schematic diagram of an assembly operation of installing the voltage regulation circuit assembly and the plastic frame into a first metal housing according to Embodiment 3 of the present application.

Referring to FIG. 20, since the low-voltage positive electrode cap 11 is relatively smooth and small in size, and the low-voltage positive electrode cap 11 is not easy to manually twist, annular teeth 24 are provided on the upper frame 21 of the plastic frame 2 in this embodiment. The annular teeth 24 are located on an upper edge of the charging interface 13, and the plastic frame 2 drives the charging interface 13 to rotate by toggling the annular teeth 24, so that the charging interface 13 is hidden. In general, when the low-voltage positive electrode cap 11 is not compressed, the annular teeth 24 cannot be exposed. When the low-voltage positive electrode cap 11 is compressed, the annular teeth 24 are exposed by moving downwards. At this time, a nail, a toothpick, a screwdriver and other objects can be used for shifting to expose or hide the charging interface 13, thereby achieving the above technical effects. Other structures and beneficial effects are consistent with Embodiment 2, and details are not described herein again.

The above are all preferred embodiments of the present application and are not intended to limit a protection scope of the present application. Therefore, all equivalent changes made according to a structure, shape and principle of the present application shall fall within the protection scope of the present application.

LISTING OF REFERENCE SIGNS 1, voltage regulation circuit assembly;
11, low-voltage positive electrode cap;
12, PCB;
13, charging interface;
14, high-voltage positive electrode elastic sheet;
15, negative electrode elastic sheet;
151, convex hull;
16, elastic ejector pin;
17, positive and negative electrodes isolation sheet;
2, plastic frame;
21, upper frame;
22, lower frame;
23, vertical guide strip;
24, annular teeth;
3, first metal housing;
31, through hole;
32, first charging avoidance hole;
4, lithium cell;
41, winding cell assembly;
42, high-voltage positive electrode cap assembly;
43, second metal housing;
4, annular rolling groove;
432, body portion;
433, contraction portion;
434, spinning edge;
5, insulation sheath;
51, second charging avoidance hole.

What is claimed is:

1. A rechargeable lithium battery, comprising a voltage regulation circuit assembly, a plastic frame, a first metal housing, a lithium cell and an insulation sheath, wherein the voltage regulation circuit assembly and the plastic frame are disposed in the first metal housing, the plastic frame is configured for fixing the voltage regulation circuit assembly, the lithium cell comprises a winding cell assembly, a high-voltage positive electrode cap assembly and a second metal housing, an annular rolling groove is formed on an upper portion of the second metal housing, the winding cell assembly is disposed in the second metal housing and is positioned by the annular rolling groove, the second metal housing is divided by the annular rolling groove into a lower body portion and an upper contraction portion, an outer diameter of the first metal housing is the same as an outer diameter of the lower body portion of the second metal housing, an inner diameter of the first metal housing is the same as an outer diameter of the upper contraction portion of the second metal housing, the upper contraction portion of the second metal housing is embedded in the first metal housing, an outer surface of the first metal housing is aligned with an outer surface of the second metal housing, and the insulation sheath is coated on the first metal housing and the second metal housing;

wherein the voltage regulation circuit assembly comprises a low-voltage positive electrode cap, a printed circuit board (PCB), a charging interface, a high-voltage positive electrode elastic sheet, a negative electrode elastic sheet and an elastic ejector pin, the charging interface, the high-voltage positive electrode elastic sheet, the negative electrode elastic sheet and the elastic ejector pin are all disposed on the PCB, the plastic frame and the low-voltage positive electrode cap are limited by a top wall of the first metal housing, a positive and negative electrodes isolation sheet is further disposed between the low-voltage positive electrode cap and the top wall of the first metal housing, a through hole is formed on a top of the first metal housing, a first charging avoidance hole is formed on a side surface of the first metal housing, the low-voltage positive electrode cap extends out of the through hole, the first charging avoidance hole is configured to expose the charging interface of the voltage regulation circuit assembly, the elastic ejector pin abuts against an inner wall of the low-voltage positive electrode cap, the negative electrode elastic sheet abuts against an inner wall of the first metal housing, the high-voltage positive electrode elastic sheet abuts against the high-voltage positive electrode cap assembly, the first metal housing and the second metal housing are in contact and conductive, and a second charging avoidance hole is formed at a corresponding position on a side surface of the insulation sheath.

2. The rechargeable lithium battery according to claim 1, wherein the first metal housing and the second metal housing are fixedly connected by spot welding, or a lower edge of the first metal housing contracts inward to form a constriction to limit the upper contraction portion of the second metal housing.

3. The rechargeable lithium battery according to claim 1, wherein the plastic frame comprises an upper frame and a lower frame fixed through snap-fit, and the PCB is fixed between the upper frame and the lower frame.

4. The rechargeable lithium battery according to claim 1, wherein the plastic frame is adhered to the inner wall of the first metal housing through glue.

5. The rechargeable lithium battery according to claim 1, wherein the plastic frame is disposed in the first metal housing in an up-and-down floating manner, and the high-voltage positive electrode elastic sheet is further configured for abutting the plastic frame against the top wall of the first metal housing.

6. The rechargeable lithium battery according to claim 5, wherein the low-voltage positive electrode cap is adhered to the plastic frame through glue, and the positive and negative electrodes isolation sheet is adhered to the plastic frame and the low-voltage positive electrode cap through glue.

7. The rechargeable lithium battery according to claim 5, wherein an outer peripheral surface of the plastic frame is provided with protruding vertical guide strips for reducing friction between the plastic frame and the inner wall of the first metal housing.

8. The rechargeable lithium battery according to claim 5, wherein the negative electrode elastic sheet is provided with a convex hull protruding outward from the negative electrode elastic sheet, and the convex hull is in contact with the inner wall of the first metal housing for reducing friction between the negative electrode elastic sheet and the inner wall of the first metal housing.

9. A method for manufacturing the rechargeable lithium battery according to claim 1, comprising the following steps:
   S1, placing the winding cell assembly into the second metal housing, manufacturing the annular rolling groove on the upper portion of the second metal housing, welding a negative electrode tab of the winding cell assembly to a bottom wall of the second metal housing, welding a positive electrode tab of the winding cell assembly to the high-voltage positive electrode cap assembly, injecting electrolyte, placing the high-voltage positive electrode cap assembly into the second metal housing, manufacturing the upper contraction portion on the upper portion of the second metal housing, manufacturing a spinning edge on an upper edge of the second metal housing, fixing the high-voltage positive electrode cap assembly inside the upper contraction portion to form the lithium cell, and performing formation and capacity sorting on the lithium cell;
   S2, fixing the voltage regulation circuit assembly on the plastic frame, and then installing the voltage regulation circuit assembly and the plastic frame together into the first metal housing;
   S3, embedding an upper end of the lithium cell into the first metal housing; and
   S4, coating the insulation sheath, performing heating and shrinking, so that the insulation sheath is coated on the first metal housing and the lithium cell.

* * * * *